United States Patent
Huang

(10) Patent No.: US 8,160,428 B2
(45) Date of Patent: Apr. 17, 2012

(54) VIDEO PLAYER AND PLAYING METHOD AND PLAY SYSTEM UTILIZING THE SAME

(75) Inventor: Wei-Chih Huang, Taipei (TW)

(73) Assignee: Princeton Technology Corporation, Hsin Tien, Taipei (TW)

(*) Notice: Subject to any disclaimer, the term of this patent is extended or adjusted under 35 U.S.C. 154(b) by 1563 days.

(21) Appl. No.: 11/416,211

(22) Filed: May 3, 2006

(65) Prior Publication Data
US 2007/0070242 A1    Mar. 29, 2007

(30) Foreign Application Priority Data
Sep. 26, 2005    (TW) .............................. 94133331 A

(51) Int. Cl.
*H04N 9/797*    (2006.01)
(52) U.S. Cl. ...................... 386/307; 386/239; 386/309

(58) Field of Classification Search .......... 386/110–112, 386/125–126
See application file for complete search history.

(56) References Cited

U.S. PATENT DOCUMENTS

| | | | |
|---|---|---|---|
| 6,573,819 B1* | 6/2003 | Oshima et al. | 386/111 |
| 7,317,868 B2* | 1/2008 | Oshima et al. | 386/111 |
| 2003/0108341 A1* | 6/2003 | Oshima et al. | 386/125 |

* cited by examiner

*Primary Examiner* — Jamie Atala
(74) *Attorney, Agent, or Firm* — Muncy, Geissler, Olds & Lowe, PLLC

(57) ABSTRACT

A video player provides a video signal to a display device. A selection unit outputs a first signal of an interlaced format or outputting a second signal of a progressive format according to a state of a selection signal. A frequency generator outputs a first frequency or a second frequency according to the state of the selection signal. An adjuster executes a first operation with the signal output from the selection unit for generating a process signal according to the frequency output from the frequency generator. A processor executes a second operation with the process signal for generating the video signal.

18 Claims, 4 Drawing Sheets

VIDEO PLAYER AND PLAYING METHOD AND PLAY SYSTEM UTILIZING THE SAME

BACKGROUND OF THE INVENTION

1. Field of the Invention

The present invention relates to a video player, and in particular relates to a video player utilizing an interlaced method or a progressive method to provide video signals.

2. Description of the Related Art

Conventional display devices, such as televisions and monitors, utilize an interlaced method or a progressive method to display video signals. The interlaced method is the older and more developed of the two. The majority of televisions utilize the interlaced method to display video signals at present. In recent years, display devices utilizing the progressive method have become increasingly popular. Thus, video players must provide compatible video signals in the interlaced and progressive formats for the display devices.

FIG. 1 is a schematic diagram of a conventional video player. The conventional video player 11 comprises a progressive adjustment unit 13, an interlaced adjustment unit 15 and processing unit 17. Progressive adjustment unit 13 adjusts a signal $S_P$ of a progressive format. Interlaced adjustment unit 15 adjusts a signal $S_I$ of an interlaced format. Processing unit 17 receives and processes the adjusted signals $S_P$ and $S_I$ for outputting the process signals $S_P$ and $S_I$ to a display device 10.

Assuming that a frame of display device 10 comprises 525 scan lines. When display device 10 is set to display a video signal of an interlaced format, processing unit 17 provides the process signal $S_I$ of the interlaced format to display device 10. Display device 10 displays the process signal $S_I$ in odd scan lines (e.g., scanning lines 1, 3, 5, 7, etc.) and then in even lines (e.g., scanning lines 2, 4, 6, 8, etc.) such that a dynamic image can be displayed.

Additionally, if the display device 10 is set to display a video signal of a progressive format, processing unit 17 provides the process signal $S_P$ of the progressive format to display device 10. Therefore, display device 10 utilizes a progressive method to display an image. Since the frequency of the progressive method is double the frequency of the interlaced method, the image of the progressive format is more detailed than the image of the interlaced format and the data amount of the image of the progressive format is more than that of the image of the interlaced format.

To provide a signal $S_P$ of the progressive format and a signal $S_I$ of the interlaced format to display device 10, conventional video player 11 comprises both progressive adjustment unit 13 and interlaced adjustment unit 15 such that the cost and volume of video player are increased.

BRIEF SUMMARY OF THE INVENTION

Video players are provided. An exemplary embodiment of a video player, which provides a video signal to a display device, comprises a selection unit, a frequency generator, an adjuster, and a processor. The selection unit outputs a first signal of an interlaced format or outputs a second signal of a progressive format according to a state of a selection signal. The frequency generator outputs a first frequency or a second frequency according to the state of the selection signal. The adjuster executes a first operation with the signal output from the selection unit for generating a process signal according to the frequency output from the frequency generator. The processor executes a second operation with the process signal for generating the video signal.

Play systems are also provided. An exemplary embodiment of a play system comprises a display device and a video player. The display device displays an image according to a video signal. The video player comprises a selection unit, a frequency generator, an adjuster, and a processor. The selection unit outputs a first signal of an interlaced format or a second signal of a progressive format according to a state of a selection signal. The frequency generator outputs a first frequency or a second frequency according to the state of the selection signal. The adjuster executes a first operation with the signal output from the selection unit for generating a process signal according to the frequency output from the frequency generator. The processor executes a second operation with the process signal for generating the video signal.

Playing methods are also provided. An exemplary embodiment of a playing method, which appropriates for a video player, comprises providing a first signal of an interlaced format or a second signal of a progressive format according to a state of a selection signal; providing a first frequency or a second frequency according to the state of the selection signal; utilizing the first frequency or the second frequency to adjust the first signal or the second signal for generating a process signal in a first operation; processing the process signal to generate a video signal in a second operation; and providing the video signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
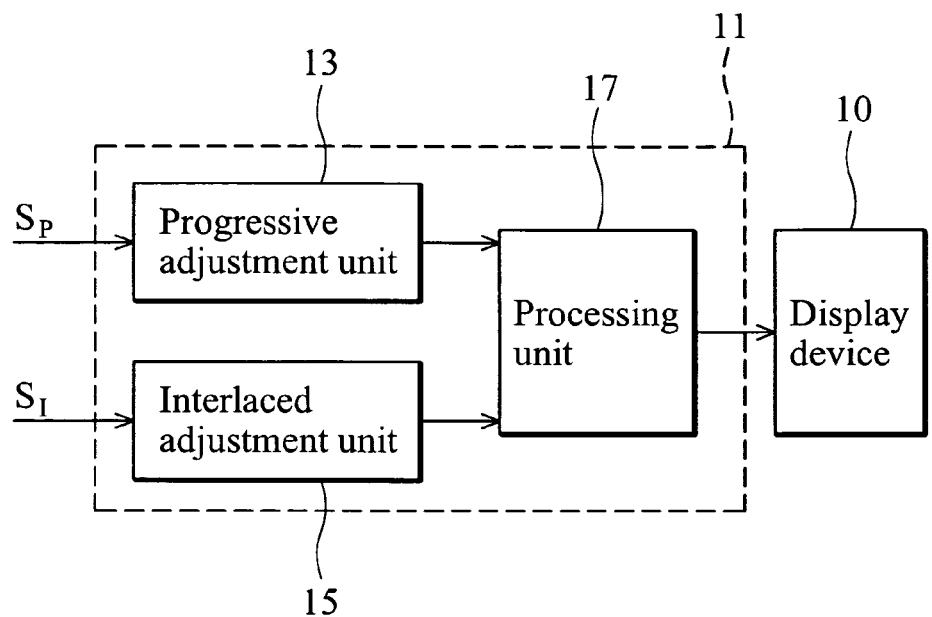
FIG. 1 is a schematic diagram of a conventional video player.
Figure 2:
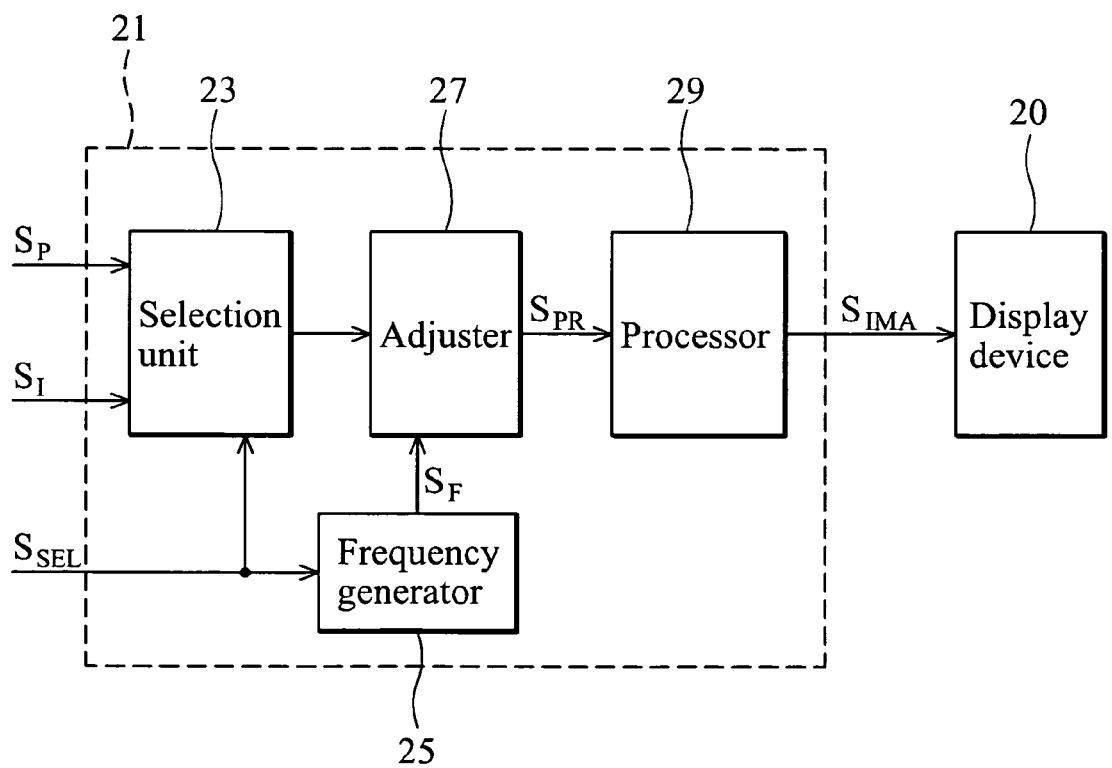
FIG. 2 is a schematic diagram of an exemplary embodiment of a play system.

FIG. 2 is a schematic diagram of an exemplary embodiment of a play system. The play system comprises a display device 20 and video player 21. Display device 20 receives a video signal $S_{IMA}$ output from video player 21, such as a digital video disc (DVD) player, and displays an image corresponding to the video signal $S_{IMA}$.

Display device 20 is a television or a monitor. When display device 20 is the television, the television receives the video signal $S_{IMA}$ through an S-video terminal, a composite-video terminal, or a component-video terminal. When display device 20 is the monitor, the monitor receives the video signal $S_{IMA}$ through an image interface.

When the video signal $S_{IMA}$ output from the video player 21 is received from the component-video terminal of the display device 20, the video signal $S_{IMA}$ comprises a luminance component Y and color-difference components Pb and Pr. When the video signal $S_{IMA}$ output from the video player 21 is received from the S-video terminal of the display device 20, the video signal $S_{IMA}$ comprises a luminance component Y and a color-shade received from the composite-video terminal of the display device 20, the video signal $S_{IMA}$ is a composite video signal (CVBS) combining a luminance component Y and a color-shade component C. When the display device 20 is a monitor and the video signal $S_{IMA}$ output from the video display 21 is received from the image interface of the monitor, the video signal $S_{IMA}$ comprises color elements R, G, and B.

Figure 3A:
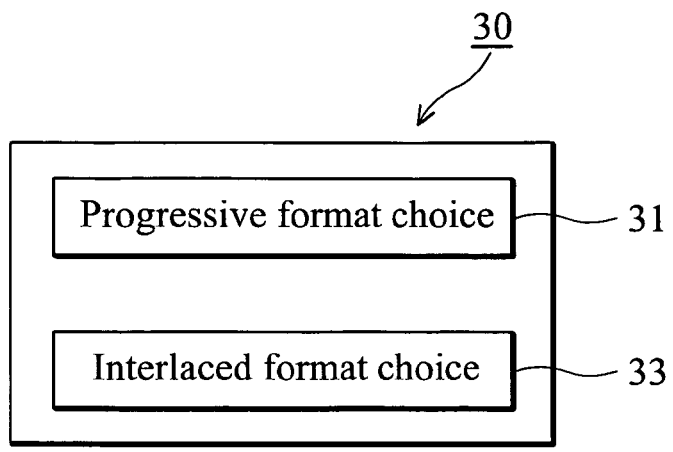
FIG. 3a is a schematic diagram of the setting image.

Since an image displayed by display device 20 has an interlaced format or a progressive format, display device 20 displays a setting image to select the format first. FIG. 3a is a schematic diagram of the setting image. The setting image has two choices. One choice is a progressive format choice 31. Another is an interlaced format choice 33.

When a user selects the progressive format choice 31, the state of a selection signal $S_{SEL}$ is set to a first state. When the interlaced format choice 33 is selected, the state of the selection signal $S_{SEL}$ is set to a second state. Video player 21 provides a video signal $S_{IMA}$ of the progressive format or the interlaced format according to the state of the selection signal $S_{SEL}$.

Figure 3B:
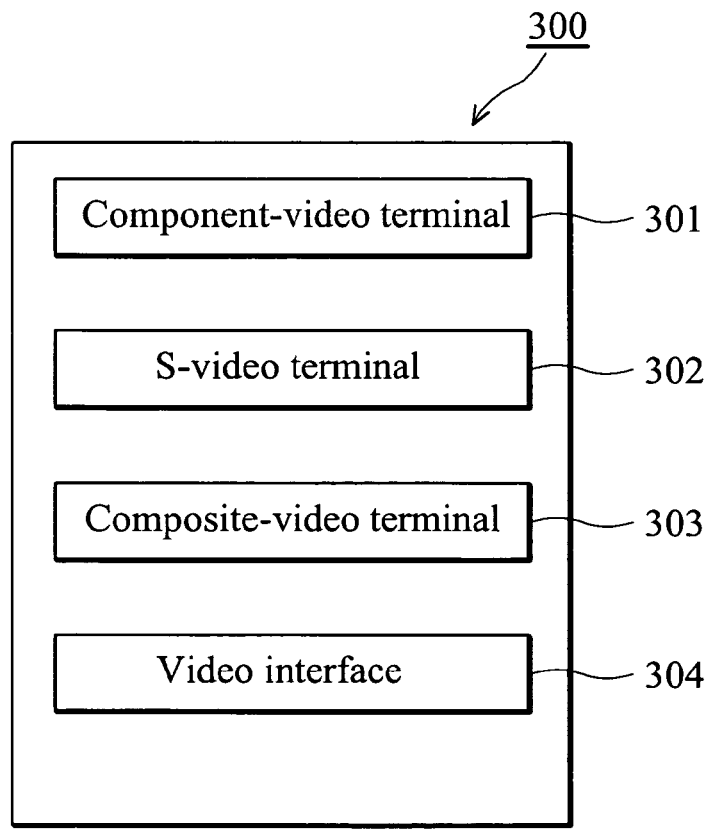
FIG. 3b is a schematic diagram of another setting image.

FIG. 3b is a schematic diagram of another setting image. When the user selects interlaced format choice 33, display device 20 displays another setting image 300. The setting image 300 comprises choices 301~304. The choice 301 represents that the video signal $S_{IMA}$ of an interlaced format is received by the component-video terminal of display device 20. The choice 302 represents that the video signal $S_{IMA}$ of the interlaced format is received by the S-video terminal of display device 20. The choice 303 represents that the video signal $S_{IMA}$ of the interlaced format is received by the composite-video terminal of display device 20. The choice 304 represents that the video signal $S_{IMA}$ of a progressive format is received by the video interface of display device 20.

Video player 21 comprises a selection unit 23, a frequency generator 25, an adjuster 27, and a processor 29.

Selection unit 23 outputs a signal $S_P$ of a progressive format or a signal $S_I$ of an interlaced format according to the state of a selection signal $S_{SEL}$. In this embodiment, as the state of the selection signal $S_{SEL}$ is at a high logic level, selection unit 23 outputs the signal $S_P$ and as the state of the selection signal $S_{SEL}$ is at a low logic level, selection unit 23 outputs the signal $S_I$.

Frequency generator 25 outputs a signal $S_F$. In this embodiment, as the state of the selection signal $S_{SEL}$ is at the high logic level, the frequency of the signal $S_F$ is equal to a first frequency and as the state of the selection signal $S_{SEL}$ is at the low logic level, the frequency of the signal $S_F$ is equal to a second frequency. The first frequency is double the second frequency.

Adjuster 27 executes a first operation with the signal output from selection unit 23 for generating a process signal $S_{PR}$ according to the frequency output from frequency generator 25. When selection unit 23 outputs the signal $S_P$, the process signal $S_{PR}$ has the progressive format. When selection unit 23 outputs the signal $S_I$, the process signal $S_{PR}$ has the interlaced format.

Since the data amount of signal $S_P$ differs from that of signal $S_I$, adjuster 27 executes a first operation with the signal output from selection unit 23 according to the frequency output from frequency generator 25. The first operation comprises a brightness process, a contrast process, or a color process. Since the first operation is well known to those skilled in the field, processes of the first operation are omitted.

Processor 29 executes a second operation with the process signal $S_{PR}$ for generating a video signal $S_{IMA}$. The second operation comprises a transformative process, a synchronization process, a color offset process, an anti-record process, a noise process, or an encode process. When the process signal $S_{PR}$ has the progressive format, the video signal $S_{IMA}$ also has the progressive format. When the process signal $S_{PR}$ has the interlaced format, the video signal $S_{IMA}$ also has the interlaced format.

Figure 4:
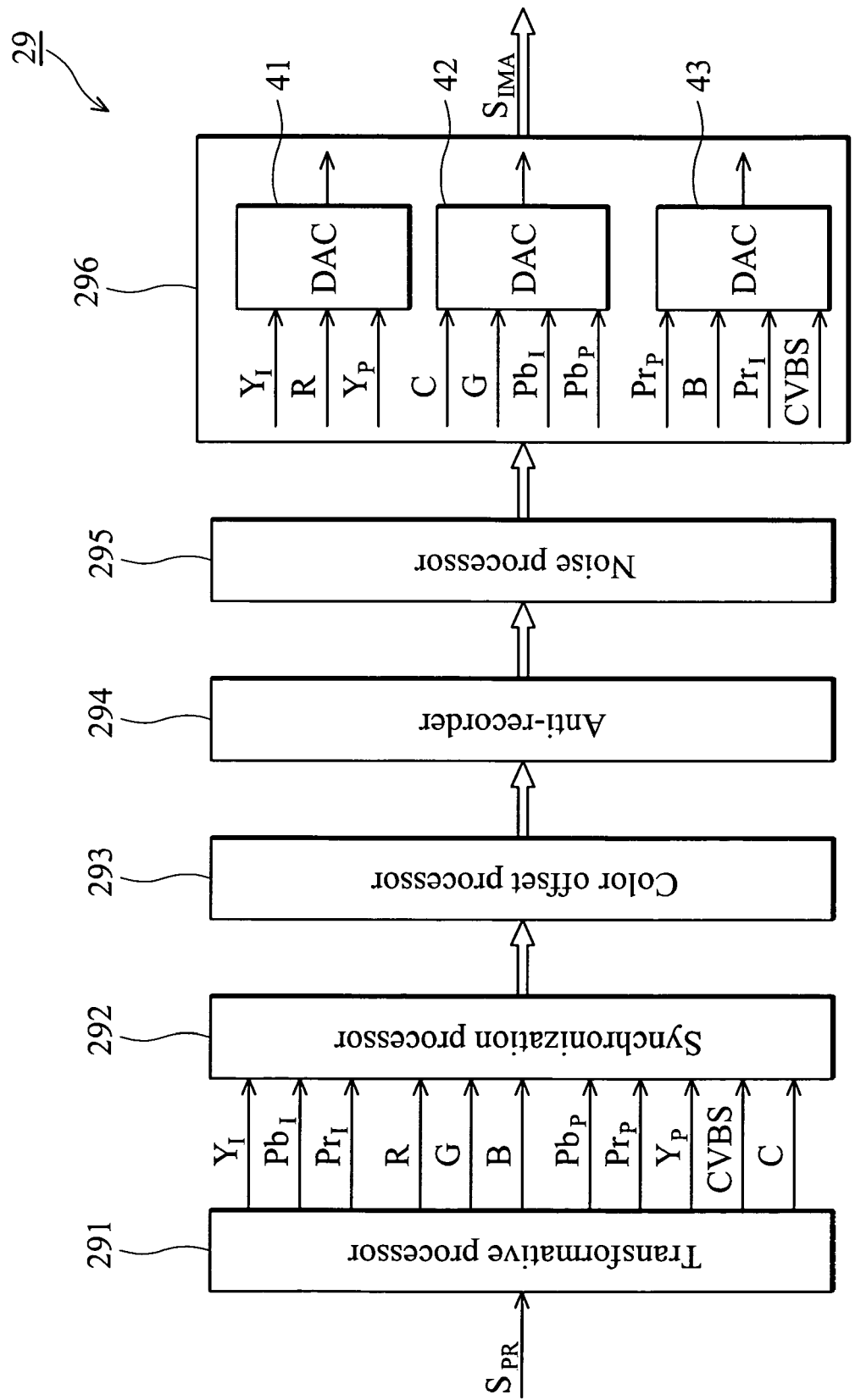
FIG. 4 is a schematic of an exemplary embodiment of processor 29.

FIG. 4 is a schematic of an exemplary embodiment of processor 29. Processor 29 comprises a transformative processor 291, a synchronization processor 292, a color offset processor 293, an anti-recorder 294, a noise processor 295, and an encoder 296.

When the user selects the choice 301 of the setting image 300, transformative processor 291 transforms the process signal $S_{PR}$ of the interlaced format into a luminance component $Y_I$, and color-difference components $Pb_I$ and $Pr_I$. When the user selects the choice 302 of the setting image 300, transformative processor 291 transforms the process signal $S_{PR}$ of the interlaced format into a luminance component $Y_I$, and a color-shade component C.

When the user selects the choice 303 of the setting image 300, transformative processor 291 transforms the process signal $S_{PR}$ of the interlaced format into a composite video signal (CVBS) combining a luminance component $Y_I$, and a color-shade component C. When the user selects the choice 304 of the setting image 300, transformative processor 291 transforms the process signal $S_{PR}$ of the interlaced format into color elements R, G, and B.

When the user selects the progressive format choice 31, transformative processor 291 transforms the process signal $S_{PR}$ of the progressive format into a luminance component $Y_P$ and color-difference components $Pb_P$ and $Pr_P$.

Synchronization processor 292 synchronizes the output signal provided from transformative processor 291. Color offset processor 293 processes the color offset of the output signal provided from synchronization processor 292. Anti-recorder 294 processes the output signal provided from color offset processor 293. Noise processor 295 filters the noise of the output signal provided from anti-recorder 294. Encoder 296 encodes the output signal provided from noise processor 295. The processes of transformative processor 291, synchronization processor 292, color offset processor 293, anti-recorder 294, noise processor 295, and encoder 296 are well known to those skilled in the art, the descriptions of the processes are omitted.

In this embodiment, encoder 296 comprises digital to analog converters (DACs) 41~43. DAC 41 encodes the luminance components $Y_I$ of the interlaced format, the color element R of the interlaced format, or the luminance $Y_P$ of the progressive format. DAC 42 encodes the color-shade component C, the color element G, or the color-difference component $Pb_I$ of the interlaced format, or the color-difference component $Pb_P$ of the progressive format. DAC 43 encodes the color-difference component $Pr_P$ of the progressive format, the color-shade component B of the progressive format, the color-difference component $Pr_I$, of the interlaced format, or the composite video signal (CVBS) of the interlaced format.

In this embodiment, to display setting images 30 and 300, video player 21 connects display device 20 through the composite-video terminal. When the user selects. the progressive format choice 31, the video signal $S_{IMA}$ is changed into output by the component-video terminal of video player 21.

When the user selects the choices 33 and 301, video player 21 provides the video signal $S_{IMA}$ of the interlaced format by the component-video terminal. When the user selects the choices 33 and 302, video player 21 provides the video signal $S_{IMA}$ of the interlaced format by the S-video terminal. When the user selects the choices 33 and 303, video player 21 provides the video signal $S_{IMA}$ of the interlaced format by the composite-video terminal. When the user selects the choices 33 and 304, video player 21 provides the video signal $S_{IMA}$ of the interlaced format by the image interface. In the other embodiment, the user also can select one of the terminals from the component-video terminal, the S-video terminal, the composite-video terminal, and the video interface, to provide the video image $S_{IMA}$ of the progressive format.

Figure 5:
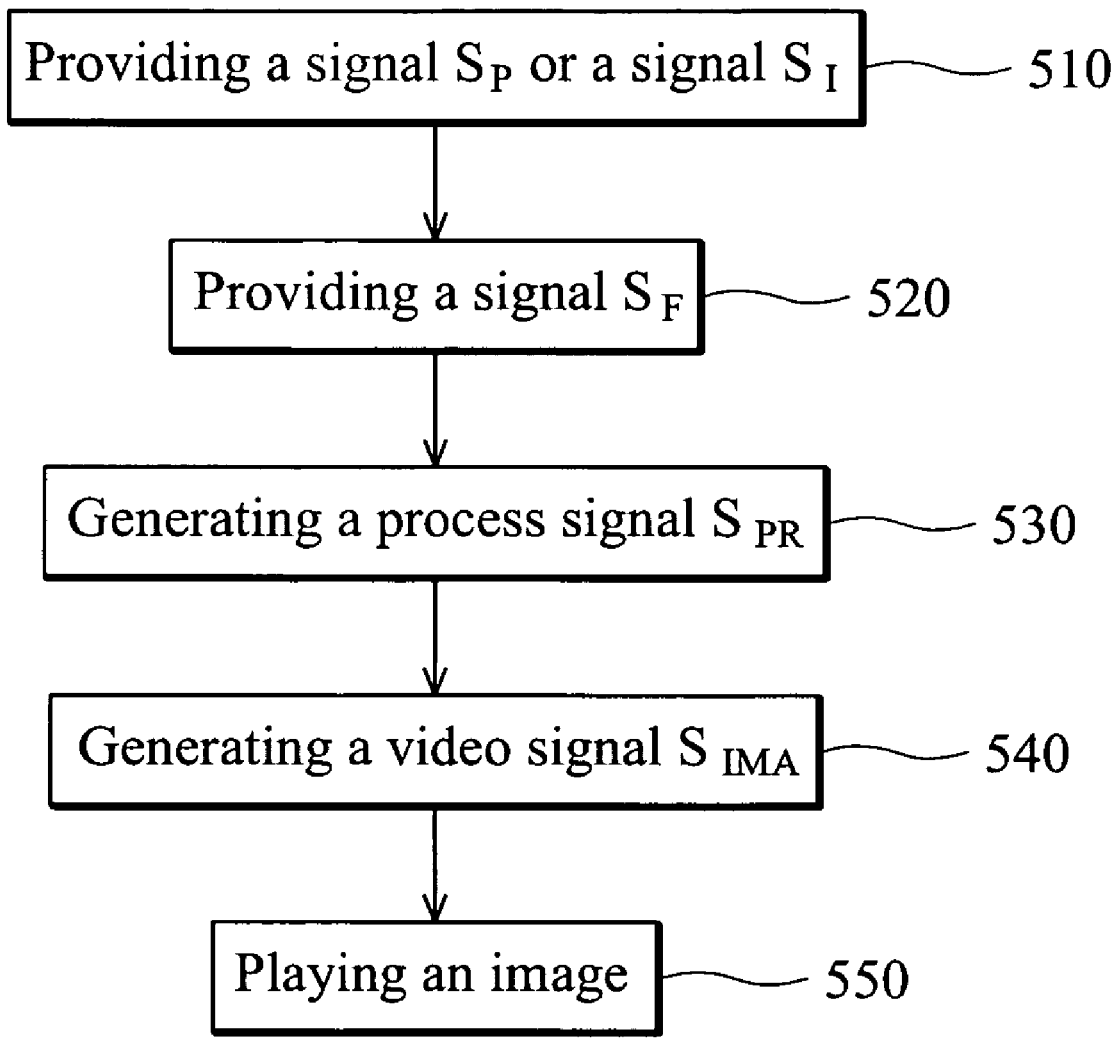
FIG. 5 is a flowchart diagram of an exemplary embodiment of a playing method.

FIG. 5 is a flowchart diagram of an exemplary embodiment of a playing method. The playing method is appropriate for a display device and a video player. With reference to FIG. 2, the principle of the playing method is described in the following.

Video player 21 provides a signal $S_P$ of a progressive format or a signal $S_I$ of an interlaced format according to a state of a selection signal $S_{SEL}$ in step 510. Assuming that video player provides the signal $S_P$ when the state of the selection signal $S_{SEL}$ is in a high logic level and video player provides the signal $S_I$ when the state of the selection signal $S_{SEL}$ stay at the low logic level.

The state of the selection signal $S_{SEL}$ is controlled according to the selected choice of a setting image 30 provided by the video player 21. When a user selects the choice 31, the state of the selection signal $S_{SEL}$ is controlled at the high logic level. When the user selects the interlaced format choice 33, the state of the selection signal $S_{SEL}$ is controlled at the low logic level.

Then, video player 21 provides a signal $S_F$ according to the state of the selection signal $S_{SEL}$ in step 520. In this embodiment, the frequency of the signal $S_F$ is a first frequency when the state of the selection signal $S_SEL$ is at the high logic level and the frequency of the signal $S_F$ is a second frequency when the state of the selection signal $S_{SEL}$ is at the low logic level. The first frequency is double the second frequency.

In a first operation, video player 21 utilizes brightness, contrast, or color of the signals $S_P$ or $S_I$ adjusted by the frequency of the signal $S_F$, to generate a process signal $S_{PR}$ in step 530. Since the processes of the first operation are well known to those skilled in the field, the descriptions of the processes are omitted. In this embodiment, video player 21 utilizes the signal $S_F$ with the first frequency to adjust the signal $S_P$ and utilizes the signal $S_F$ with the second frequency to adjust the signal $S_I$.

Video player 21 processes the process signal $S_{PR}$ to generate a video signal $S_{IMA}$ in a second operation, in step 540. The second operation comprises a transformative process, a synchronization process, a color offset process, an anti-record process, a noise process, or a encode process. Since the processes of the second operation are well known to those skilled in the art, the descriptions of the processes are omitted.

Finally, video player 21 provides the video signal $S_{IMA}$ to display device 20 for displaying an image corresponding to the video signal $S_{IMA}$ in step 550. When the user selects the choice 31, display device 20 utilizing a progressive method to display the image. When the user selects the interlaced format choice 33, display device 20 utilizing an interlaced method to display the image.

In summary, the conventional video player requires a progressive adjustment unit and an interlaced adjustment unit to adjust a signal of a progressive format or an interlaced format. The video player of the invention only requires an adjustment unit to adjust the signal of a progressive format or an interlaced format. Therefore, the number of elements and the volume of the video player are reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video player providing a video signal to a display device, comprising:
    a selection unit outputting a first signal of an interlaced format or outputting a second signal of a progressive format according to a state of a selection signal;
    a frequency generator outputting a first frequency or a second frequency according to the state of the selection signal, wherein the selection unit outputs the first signal of the interlaced format when the selection signal is at a first logic level, and the selection unit outputs the second signal of the progressive format when the selection signal is at a second logic level;
    an adjuster executing a first operation with the signal output from the selection unit for generating a process signal according to the frequency output from the frequency generator, wherein the frequency generator outputs the first frequency when the selection signal is at the second logic level, and the frequency generator outputs the second frequency when the selection signal is at the first logic level; and
    a processor executing a second operation with the process signal for generating the video signal.

2. The video player as claimed in claim 1, wherein the first frequency is double the second frequency.

3. The video player as claimed in claim 1, wherein the first operation comprises a brightness process, a contrast process, or a color process.

4. The video player as claimed in claim 1, wherein the second operation comprises a transformative process, a synchronization process, a color offset process, an anti-record process, a noise process, or an encode process.

5. The video player as claimed in claim 1, wherein the video signal is received through an S-video terminal, a composite-video terminal, or a component-video terminal of the display device.

6. A play system, comprising:
    a display device displaying an image according to a video signal; and
    a video player comprising:
        a selection unit outputting a first signal of an interlaced format or outputting a second signal of a progressive format according to a state of a selection signal, wherein the selection unit outputs the first signal of the interlaced format when the selection signal is at a first logic level, and the selection unit outputs the second signal of the progressive format when the selection signal is at a second logic level;

a frequency generator outputting a first frequency or a second frequency according to the state of the selection signal, wherein the frequency generator outputs the first frequency when the selection signal is at the second logic level and the frequency generator outputs the second frequency when the selection signal is at the first logic level;

an adjuster executing a first operation with the signal output from the selection unit for generating a process signal according to the frequency output from the frequency generator; and a processor executing a second operation with the process signal for generating the video signal.

7. The play system as claimed in claim 6, wherein the first frequency is double the second frequency.

8. The play system as claimed in claim 6, wherein the first operation comprises a brightness process, a contrast process, or a color process.

9. The play system as claimed in claim 6, wherein the second operation comprises a transformative process, a synchronization process, a color offset process, an anti-record process, a noise process, or an encode process.

10. The play system as claimed in claim 6, wherein the display device is a television or a monitor.

11. The play system as claimed in claim 6, wherein the video player is a digital video disc (DVD) player.

12. The play system as claimed in claim 6, wherein the video signal is received through an S-video terminal, a composite-video terminal, or a component-video terminal of the display device.

13. A playing method, appropriate for a video player, comprising:

providing a first signal of an interlaced format or a second signal of a progressive format by a receiver according to a state of a selection signal, wherein the first signal of the interlaced format is provided when the selection signal is at a first logic level, and the second signal of the progressive format is provided when the selection signal is at a second logic level;

providing a first frequency or a second frequency according to the state of the selection signal, wherein the first frequency is provided when the selection signal is at the second logic level, and the second frequency is provided when the selection signal is at the first logic level;

utilizing the first frequency or the second frequency to adjust the first signal or the second signal for generating a process signal in a first operation;

processing the process signal to generate a video signal in a second operation; and providing the video signal.

14. The playing method as claimed in claim 13, wherein the video signal is played by a display device.

15. The playing method as claimed in claim 14, further comprising:

providing a setting image comprising a plurality of choices; and controlling the state of the selection signal according to the selected choice.

16. The playing method as claimed in claim 14, wherein the first frequency is double the second frequency.

17. The playing method as claimed in claim 14, wherein the first operation comprises a brightness process, a contrast process, or a color process.

18. The playing method as claimed in claim 14, wherein the second operation comprises a transformative process, a synchronization process, a color offset process, an anti-record process, a noise process, or an encode process.

* * * * *